May 9, 1939.  W. B. JONES  2,157,706
WEIGHING AND WEIGHT CHANGE INDICATING DEVICE
Filed March 21, 1938
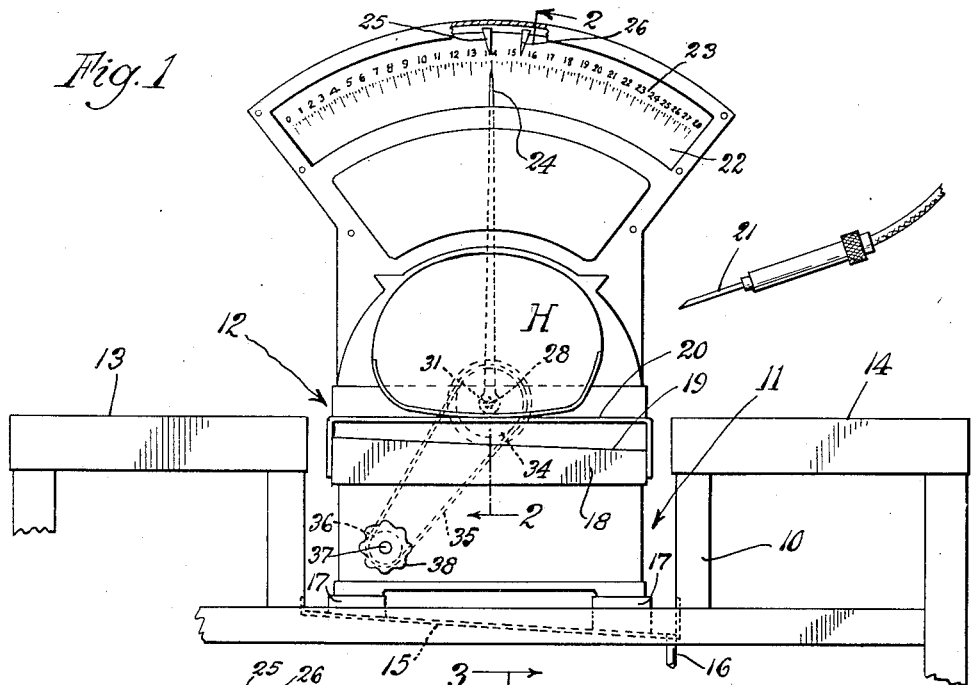
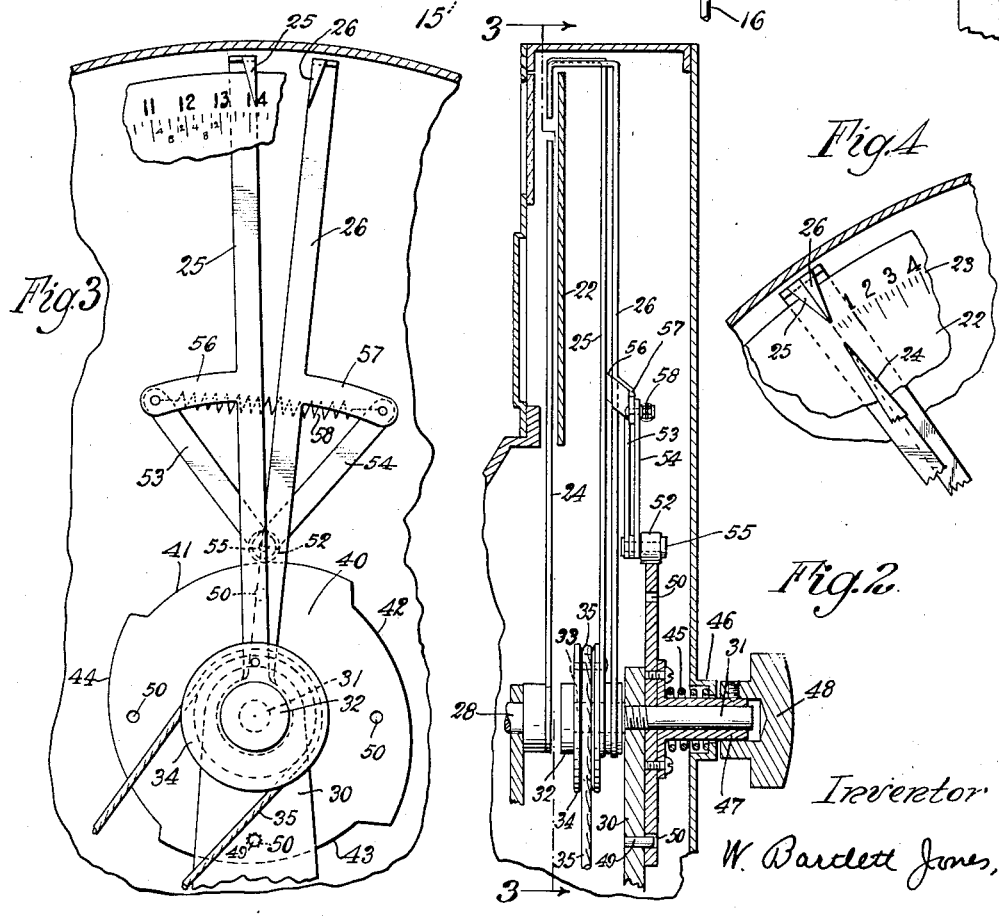
Inventor
W. Bartlett Jones Patented May 9, 1939

2,157,706

UNITED STATES PATENT OFFICE 2,157,706

WEIGHING AND WEIGHT CHANGE INDICATING DEVICE

W. Bartlett Jones, Chicago, Ill., assignor to The Griffith Laboratories, Inc., Chicago, Ill., a corporation of Illinois Application March 21, 1938, Serial No. 197,057

17 Claims. (Cl. 116—129)

The present invention relates to weighing devices and in particular to a device useful to change the weight of an article or material in a predetermined way without mental effort, and even without knowledge of actual weights. It has particular reference to use in pickling hams by adding a definite percentage of pickle liquor to a ham, but its use is by no means limited.

In my earlier application Serial No. 170,306, filed October 22, 1937, I have shown a device for such purposes comprising a primary or true-weight-indicating needle and a secondary needle moved by and with the primary indicator in a controlled manner to indicate a predetermined position of the secondary indicator for positions of the primary indicator. In addition there is therein described a manually movable pointer to record any past position of either indicator after the indicators have moved. Also there is particularly described a cam device which is operative to determine the position of the secondary indicator by the position of the first indicator. Such a cam device may be used for scales of non-uniform calibration, because a geared ratio device is impossible.

Certain disadvantages obtain with such devices. Possible constructions place too much drag on the weighing mechanism particularly where a high degree of accuracy is desired. The present invention aims to improve upon my prior constructions without making any change in the character or number of movements necessary for an operation, and in fact with simplification of the device.

The object of the invention is to provide for a weighing device a manually operated auxiliary device entirely apart from the weighing mechanism, having two indicating means each positioned to register on the calibrated scale, or in the same range as the weight needle, and having a predetermined relation between the positions of the two indicating means.

Another object of the invention is to provide a simple construction and to improve the results by having the two indicators coaxial, and also having the three indicators coaxial.

Various other and ancillary objects and advantages of the invention will be apparent from the following description and explanation of the invention as it is embodied in the scale for pickling hams as shown in the accompanying drawing. In the drawing:

Fig. 1 represents a scale mounted on a table for co-operation in facilitating the pickling of hams.

Fig. 2 is a vertical enlarged and fragmentary section of the weighing device in Fig. 1, taken on the line 2—2 of Fig. 1.

Fig. 3 is a front elevation of the parts shown in Fig. 2, with the dial plate partially removed, as taken on the line 3—3 of Fig. 2.

Fig. 4 is a fragmentary view of the indicators and dial-plate showing the zero-position of all indicators.

It is contemplated that the invention may be applied on dials having multiple scales, such for example as price-scales, wherein a radial or other indicator crosses price lines for different price-base zones. Such scales are commonly found in food-stores and the present invention is applicable to them to have one of the two indicators hereinafter described read a given discount when the other is set on the full price. The invention is particularly applicable to the meat-curing art, wherein a given weight of ham is injected with a liquid picke until it attains a given percentage increase in weight, when the injection is stopped. This operation may be carried out while the ham is being weighed and is stopped when the true-weight needle reaches the mark set by use of the present invention.

To avoid confusion in the discussion, the true-weight needle is hereinafter called the "weight needle". The independent pointers which are associated are called the "control pointer" and the "follower", and are interchangeable in function so far as construction is concerned.

Generally, the invention is described by reference to a weighing device having a pivoted weight needle and a calibrated scale therefor. In the preferred form the control pointer and the follower are pivoted coaxially with the weight needle, but independently thereof, yet sufficiently close to the scale or dial to register thereon without interfering with the true-weight needle. The two pointers are each movable together, but movable with respect to each other by means connecting them, including structure for predetermining a separation of the pointers according to the position of the control pointer in the range of movement. In operation the control pointer is moved manually to coincide with the position of the weight needle on the dial. This causes the follower to register elsewhere on the dial at a point either above or below the position of the true weight. Such registration may be a given percentage above or below the true-weight over which the control pointer is set, or it may be some other predetermined value. Where the dial graduations are uniform the two associated pointers may be interconnected by a train of gears. But where the graduations are not uniform other means is employed, such as a cam device, used in my earlier application.

In illustrating the invention therefore the cam device will be employed, and it is to be understood that it is illustrative, as a more universally useful means for the purpose, a gear relation being of limited utility.

In the drawing there is shown a table or bench 10 with its table surface substantially coextensive with the platform of a scale associated therewith. The table 10 has a recess 11 therein in which is set a scale or weighing device 12. The table has horizontal top portions 13 and 14 at each side of the scale, an inclined floor 15 in the recess between said top portions, drain 16 to catch waste liquid, and raised level supports 17 on which the scale 12 is removably set. The scale has a platform 18 with inclined surface 19 for draining liquid and a raised horizontal grid 20 which is generally flush with table tops 13 and 14. A ham H is shown on the scale grid 20, which is injected with pickle by suitable means, such as pickle injection needle 21. The scale is of a standard type having dial plate 22 with dial or calibrated scale 23 and weight-needle 24. The dial is shown as having unequal weight units, or non-uniformly calibrated.

The dial 23 is merely representative of a range over which the weight needle 24 moves. For pickling hams as herein described, it is not at all necessary to refer to the weight units marked on the dial, and hence they could be omitted, whereupon the device is operated as a weight-changing device rather than as a weighing device.

Fig. 1 shows pointers 25 and 26 movable over the same range as the weight-needle 24. In Fig. 4 all three indicators 24, 25 and 26 are shown registering at "zero" position on the calibrated scale 23. In Fig. 1, the pointers 25 and 26 are shown spaced apart. Pointer 25 registers the same as weight needle 24, because in the construction for operation to increase weight, pointer 25 is used as the control pointer. A construction is used whereby pointer 26, which becomes the "follower", moves with control pointer 24 and is spaced apart from it according to the position of the control pointer 24 in the range.

Because the dial 23 is arcuate and weight-needle 24 operates radially on pivot axis 28, the pointers 25 and 26 preferably move radially and coaxially therewith, so as to register in the same way over the arcuate dial 23. The pointers 25 and 26 and the means to associate them are preferably located behind dial plate 22, and therefore the registering parts are carried over the top of dial plate 22 and down over its face. For convenience the same numbers 25 and 26 are applied to the arms of the pointers behind the dial plate 22.

In the rear of the scale proper, there is a vertical bracket plate 30 into which is threaded a stud shaft 31 extending from both faces of the bracket plate. The shaft 31 is coaxial with axis 28 of the weight-needle, but entirely independent thereof. On the end toward the front of the scale there is a nut-like member with a head 32 and a threaded sleeve 33 which is a bearing axis on which turn both pointers 25 and 26. Pointer 25 is provided with means to permit manual operation thereof, preferably from the front of the scale proper. Illustrative mechanism is shown in the form of pulley 34 rigid with the pointer 25 to turn on sleeve 33, a belt 35, a smaller pulley 36 carried on shaft 37, which runs in the base of the scale from the back to the front, where it bears a manual knob 38 to turn it.

Pointer 26 is free to turn on sleeve 33, but is constrained by its association with pointer 25. There is a device to predetermine the position of pointer 26 by the position of pointer 25. This is readily accomplished by means including a cam, and a construction is provided whereby several cams are available for selective use. In order to avoid removing and inserting different cams, a multiple cam member is provided, as on a disk, so that the position of the disk may be changed to change from one cam to another.

Accordingly, there is a circular disk 40, here shown with 4 cams 41, 42, 43 and 44, mounted for free rotation on stud shaft 31 at the rear of the scale. This cam disk is urged against bracket plate 30 by a spring 45 acting against rear part 46 of the scale casing. The cam disk 40 is connected to a bearing sleeve 47 over which helical spring 45 is placed. A knob 48 is secured to the sleeve to turn the cam disk. Pulling on the knob 48 moves the cam disk on its axis to disengage it from a positioning pin 49 mounted in bracket plate 30 to register in holes 50 for each of the cams 41 and 44.

Each cam acts upon a cam-rider in the form of a roller 52 which is sufficiently wide to permit the described axial motion of the cam to reset the disk. Roller 52 is mounted on a toggle linkage, which connects the two pointers 25 and 26, and comprises links 53 and 54, preferably of equal length as shown, pivoted together at 55 where the cam roller is also located. Link 53 is pivoted to side arm 56 on pointer 25, and link 54 is pivoted to side arm 57 on pointer 26. A spring 58 connects side arm 56 to side arm 57 to urge the pointers together, and hence to urge roller 52 downwardly onto a cam. Thus the variation in the cam at different positions of the roller predetermines the separation of pointers 25 and 26.

For pickling hams it is common to increase the weight of a ham by a fixed but predetermined percentage, for example 8%, 10%, 12% or 16%. Therefore, each cam must be predesigned by calibration to give a constant ratio, the design thus accounting for the non-uniform calibration of dial 23. It is of course to be understood that a cam may be designed for any relation other than a fixed ratio, where such is desired. It is also to be understood that a cam may be designed to maintain a constant weight-indicating separation between the pointers 25 and 26. Where the scale calibration is uniform the cam would thus be concentric with the axis of the pointers, but where the calibrations are non-uniform, the separation of the pointers would change according to the different unit-lengths over the dial.

The device as shown is safe against jamming of the follower 26 at a high weight on the dial. As the pointer 25 is moved so that the follower becomes so far advanced as to be in danger of jamming at the end, the cam roller runs off the cam onto the next cam at its lower end, thus permitting the pointers to move together before jamming.

It is to be understood that the pointers 25 and 26 as shown over the face of the dial may be extended downwardly over the face, where auxiliary markings are used on the face, such as prices. By a properly designed cam, pointer 26 may be used as the control pointer, and then pointer 25 becomes the follower, as for example to reduce weights, or to give discounted prices, from a price determined by the weight-needle 24.

The coaxial arrangement of pointers and other features described herein may be used in a construction like that of my copending application Serial No. 170,306, filed October 22, 1937. For example, the "follower" may be associated with the weight-needle 24 by the toggle and cam, and the pointer 25 may be retained as merely a manual pointer as in said prior application. The present application is generic to the constructions disclosed herein and in the said prior application.

The disclosed structure is preferred over the disclosed structure of my copending application. In use, the starting weight is registered by pointer 25 and the finishing weight by pointer 26. The operator sees the range of weight to be added, and added, because there is no motion. In addition he sees how far along in the operation he has progressed, by observing the weight needle 24. This is of great advantage practically in pickling hams. Hams present two arteries which are used in pumping pickle. It is often desired to place a more or less definite percentage of all the pickle in one artery and the remainder in the other. For example, if 60% goes in one artery and 40% in the other, the operator can approximate this division by visually following the needle 24 as it moves from pointer 25 to pointer 26, then shifting from one artery to the other when about 60% of the range has been traversed.

Another advantage of the present construction over my prior construction is the fact that but one needle returns to zero position in each operation, and that is the weight-needle 24. The manual adjustment of the present drawing and the drawing of my prior application is very slight in each instance of use, because hams are closely the same in weight.

Various other uses, changes and modifications may be made without in any way departing from the spirit and scope of the invention as set forth in the appended claims.

I claim:

1. A weighing device having in combination a true-weight primary indicating means comprising an indicating element and a weight-actuated registering marker for visual indications on said element, secondary weight indicating means comprising a second and manually movable marker, a third movable marker operably connected to the second marker to move therewith, and means for causing the second and third markers to be spaced along the indicating element with predetermined separation by the position of one of them on the element.

2. A weighing device having in combination a true-weight primary indicating means comprising an indicating element and a weight-actuated registering marker for visual indications on said element, secondary weight indicating means comprising a second and manually movable marker, a third movable marker operably connected to the second marker to move therewith, and means for causing the second and third markers to be spaced along the indicating element with a predetermined separation such that when one of them registers coincidentally with the true-weight marker, the other registers a weight having a predetermined ratio to the true weight.

3. A weighing device having in combination a true-weight primary indicating means comprising a non-uniformly calibrated scale and a weight-actuated registering marker for visual indications on said scale, secondary weight indicating means comprising a second and manually movable marker, a third movable marker operably connected to the second marker to be moved therewith, and means including a cam element operatively related to the second and third markers for causing the second and third markers to be spaced along the calibrated scale with a predetermined separation such that when one of them registers coincidentally with the true-weight marker, the other registers a weight having a predetermined ratio to the true weight.

4. A weighing device having in combination a true-weight indicating pivotal radial pointer, a visual indicating element therefor, a second coaxial pivotal radial pointer arranged for manual operation over the same element, a third coaxial pivotal radial pointer operatively connected to be movable with the second pointer, and means for causing the second and third pointers to be spaced along the element with a separation predetermined by the position of one of them relative to the element.

5. A weighing device having in combination a true-weight indicating pivotal radial pointer, a visual indicating element therefor, a second coaxial pivotal radial pointer arranged for manual operation over the same element, a third coaxial pivotal radial pointer operatively connected to be movable with the second pointer, and means for causing the second and third pointers to be spaced along the element with a predetermined separation such that when one of them registers coincidentally with the true-weight pointer the other registers on said element according to a weight having a predetermined ratio to the true weight.

6. A weighing device having in combination a true-weight indicating pivotal radial pointer, a visual non-uniformly calibrated scale therefor, a second coaxial pivotal radial pointer arranged for manual operation over the same scale, a third coaxial pivotal radial pointer operatively connected to be movable with the second pointer, and means including a cam element operatively related to the second and third pointers to cause the second and third pointers to be spaced along the calibrated scale with a separation predetermined by the position of one of them on the scale.

7. In an indicating device, in combination two coaxial pivotal needles, a toggle linkage connecting said needles, and means including the toggle linkage and a cam device acting on said toggle linkage to maintain a predetermined separation between said needles according to the position of one of them from a point of reference.

8. In an indicating device having an arcuate scale, in combination two coaxial pivotal pointers for said scale, a toggle linkage connecting said pointers, means including the toggle linkage and a cam device acting on said toggle linkage to maintain a predetermined separation between said pointers according to the position of one of them on said scale from a point of reference, and a turnably positioned rotary element carrying said cam and one or more other cams so that said rotary element may be turned to present selected cams for changing the character of said predetermined separation.

9. In an indicating device having a range over which a weight-needle is movable, two pointers movable over said range, a toggle linkage connecting the two pointers together, a cam rider associated with said toggle linkage, and a cam operating on the toggle linkage through said rider to predetermine the separation of the pointers by the position of the rider on the cam.

10. A weight-changing device comprising in combination an indicator movable over a predetermined range according to the weight of an article the weight of which is to be changed, a manually controlled indicator movable over the same range, and a third indicator movable over the same range and operatively connected to one of said other indicators to be movable therewith, and means for causing the said operatively connected indicators to be spaced along said range with a separation predetermined by the position of one of said connected indicators in the range, whereby when the first indicator has registered the original weight of an article to be changed in weight a manual adjustment may be made to position one of the other two indicators over an appropriate indicated position in the range to establish a set position in the range as a goal, which goal has said predetermined relation to the original weight of the article, whereby the weight of the article may be changed in a predetermined manner without necessity for knowledge or indication of the actual weight of the article.

11. A weight-changing device comprising in combination two coaxial radially movable indicators mounted to swing in a range to a position therein corresponding to the weight of an article, one indicator being adapted to be moved by the weight of the article, and the other being adapted to be moved manually, a third coaxial radial indicator for said range operatively connected with one of said other indicators for motion therewith, and means for causing a predetermined radial separation of the connected indicators according to the position of one of the connected indicators in the range.

12. A weight-changing device comprising in combination two coaxial radially movable indicators mounted to swing in a range to a position therein corresponding to the weight of an article, one indicator being adapted to be moved by the weight of the article, and the other being adapted to be moved manually, a third coaxial radial indicator for said range, and means including a cam operatively connecting the third indicator with one of said other indicators for motion therewith to establish a predetermined radial separation of the connected indicators according to the position of one of the connected indicators in the range.

13. A weight-changing device comprising in combination two coaxial radially movable indicators mounted to swing in a range to a position therein corresponding to the weight of an article, one indicator being adapted to be moved by the weight of the article, and the other being adapted to be moved manually, a third coaxial radial indicator for said range, a toggle linkage connecting the third indicator with one of the other indicators, and means including a cam operable on the toggle linkage for holding the connected indicators at a predetermined radial separation according to the position of one of the connected indicators in the range.

14. A weight-changing scale comprising three movable indicating elements registerable in the same range, two of them being operatively connected as a unit, means for causing the said connected elements to separate their registrations in said range according to a predetermined percentage difference in the original weight of an article and the weight of it as it is to be changed, one member of the group consisting of said unit and said third element being adapted for actuation by the weight of an article to register in said range, and the other member of said group being adapted for manual operation, whereby one element of said unit and the said third element may be made to register together by a manual operation when there is such actuation by the original weight of an article the weight of which is to be changed, the manually operated member of the said group thereafter indicating a goal in the range for the weight-actuated member of said group in changing the weight of the article.

15. A weight changing scale comprising a range over which three indicators are movable, a weight indicator movable to register in said range at a point comparable to the weight of an article and at a given point for the original weight of an article the weight of which is to be changed, a second indicator movable manually to register at said given point, a third indicator associated with said second indicator and movable therewith in setting the second indicator manually whereby the third indicator establishes a goal in the range to which the weight indicator is movable in changing the weight of the article, and means controlling the position of the second and third indicators relative to each other in their movable association, whereby the said means establishes a fixed ratio between the original weight and the changed weight when the second indicator is at said point and the third indicator and the weight indicator are both at said goal.

16. In an indicating device, in combination two coaxial pivotal indicating needles, connecting means between said two needles for causing said two needles to move simultaneously, and a cam operable to vary the effective connection of said means whereby the separation between said needles is predetermined by the position of one of them from a point of reference.

17. In an indicating device having a range over which a value may be indicated, two pointers movable over said range, connecting means between said two pointers for causing said pointers to move simultaneously over said range, and a cam operable to vary the effective connection of said means whereby the spacing between the positions of said pointers in the range is predetermined by the cam according to the position of one of said pointers in the range.

W. BARTLETT JONES.